(12) United States Patent
Kukimiya et al.

(10) Patent No.: US 10,795,689 B2
(45) Date of Patent: Oct. 6, 2020

(54) RECONFIGURABLE LOGICAL CIRCUIT

(71) Applicant: FUJI XEROX CO., LTD., Tokyo (JP)

(72) Inventors: Ryo Kukimiya, Kanagawa (JP);
Masatomo Igarashi, Kanagawa (JP);
Masahiro Ishiwata, Kanagawa (JP);
Junichi Uchiyama, Kanagawa (JP);
Hirofumi Sasaki, Kanagawa (JP);
Mitsuyuki Tamatani, Kanagawa (JP);
Kazuo Yamada, Kanagawa (JP)

(73) Assignee: FUJI XEROX CO., LTD., Minato-ku, Tokyo (JP)

(*) Notice: Subject to any disclaimer, the term of this patent is extended or adjusted under 35 U.S.C. 154(b) by 176 days.

(21) Appl. No.: 15/442,041

(22) Filed: Feb. 24, 2017

(65) Prior Publication Data

US 2018/0060096 A1    Mar. 1, 2018

(30) Foreign Application Priority Data

Aug. 25, 2016 (JP) .................................. 2016-164829

(51) Int. Cl.
| | | |
|---|---|---|
| *G06F 9/44* | (2018.01) | |
| *G06F 9/445* | (2018.01) | |
| *G06F 15/78* | (2006.01) | |
| *G06F 21/57* | (2013.01) | |
| *G06F 21/76* | (2013.01) | |
| *G06F 21/62* | (2013.01) | |

(52) U.S. Cl.
CPC ...... *G06F 9/44505* (2013.01); *G06F 15/7867* (2013.01); *G06F 15/7871* (2013.01); *G06F 21/57* (2013.01); *G06F 21/6218* (2013.01); *G06F 21/76* (2013.01)

(58) Field of Classification Search
None
See application file for complete search history.

(56) References Cited

U.S. PATENT DOCUMENTS

| | | | | |
|---|---|---|---|---|
| 4,642,487 | A | 2/1987 | Carter | |
| 4,870,302 | A | 9/1989 | Freeman | |
| 8,468,335 | B2* | 6/2013 | Lin | ......... G06F 17/16 712/15 |
| 2006/0010306 | A1* | 1/2006 | Saito | .......... G06F 15/8007 712/226 |
| 2009/0113169 | A1* | 4/2009 | Yang | ........... G06F 7/57 712/15 |

(Continued)

FOREIGN PATENT DOCUMENTS

| | | |
|---|---|---|
| JP | 61-198919 A | 9/1986 |
| JP | 2006031127 A | 2/2006 |
| JP | 2008225662 A | 9/2008 |

OTHER PUBLICATIONS

Notice of Reasons for Refusal dated Feb. 18, 2020 from the Japanese Patent Office in application No. 2016-164829.

*Primary Examiner* — Fahmida Rahman
(74) *Attorney, Agent, or Firm* — Sughrue Mion, PLLC

(57) ABSTRACT

A reconfigurable logical circuit includes a data processing unit; a memory in which plural combinations of configuration control bits are stored; and a selector unit that selectively switches the plural combinations of configuration control bits stored in the memory and supplies a selected one of the plural combinations of configuration control bits to the data processing unit to reconfigure processing contents of the data processing unit.

19 Claims, 13 Drawing Sheets

(56) References Cited

U.S. PATENT DOCUMENTS

2012/0191967 A1* 7/2012 Lin .................. G06F 17/16
713/100
2013/0246735 A1* 9/2013 Park .................. G06F 15/8023
712/15

* cited by examiner

| RECONFIGURATION PERMISSION REGISTER | RECONFIGURATION OPERATION WHEN REGISTER VALUES MATCH |
|---|---|
| 0X00 | NOT RECONFIGURED |
| 0X01 | RECONFIGURED TO PROCESSING A |
| 0X02 | RECONFIGURED TO PROCESSING B |

FIG. 10
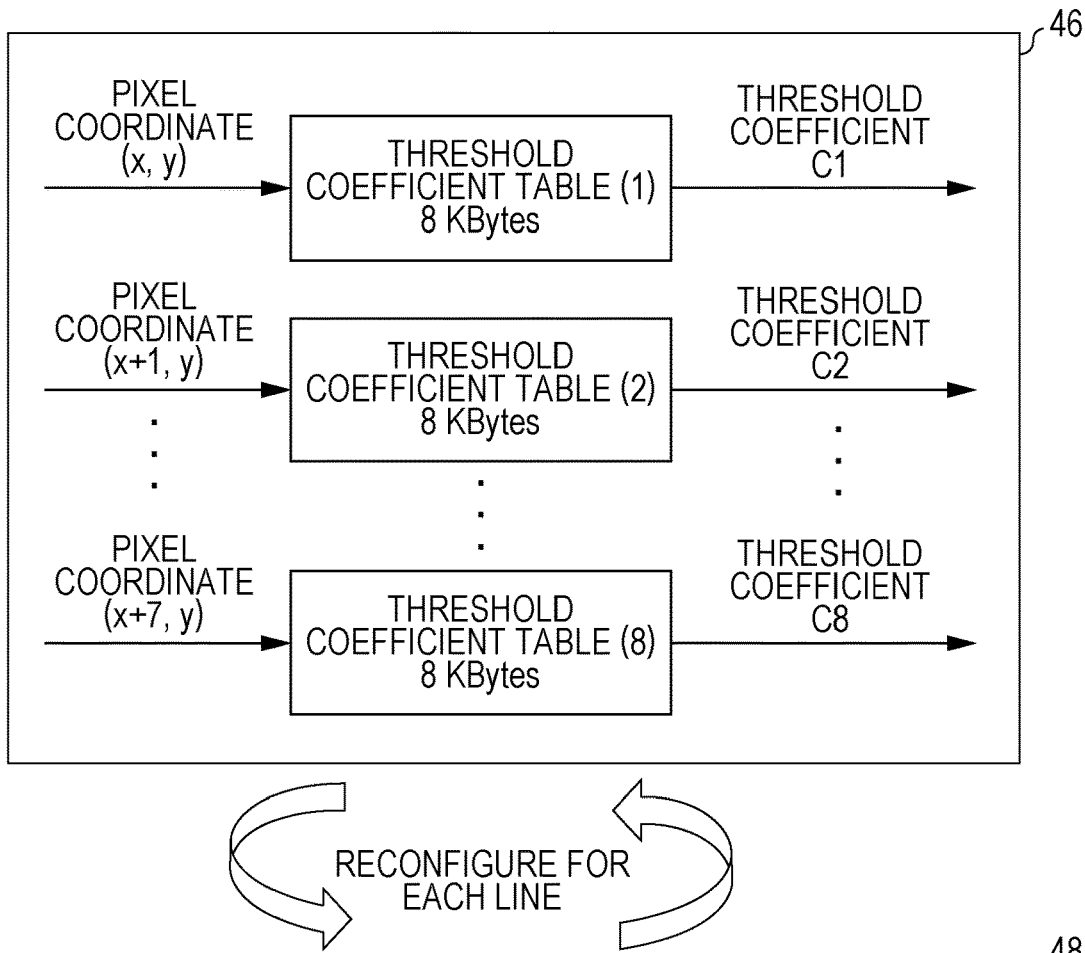
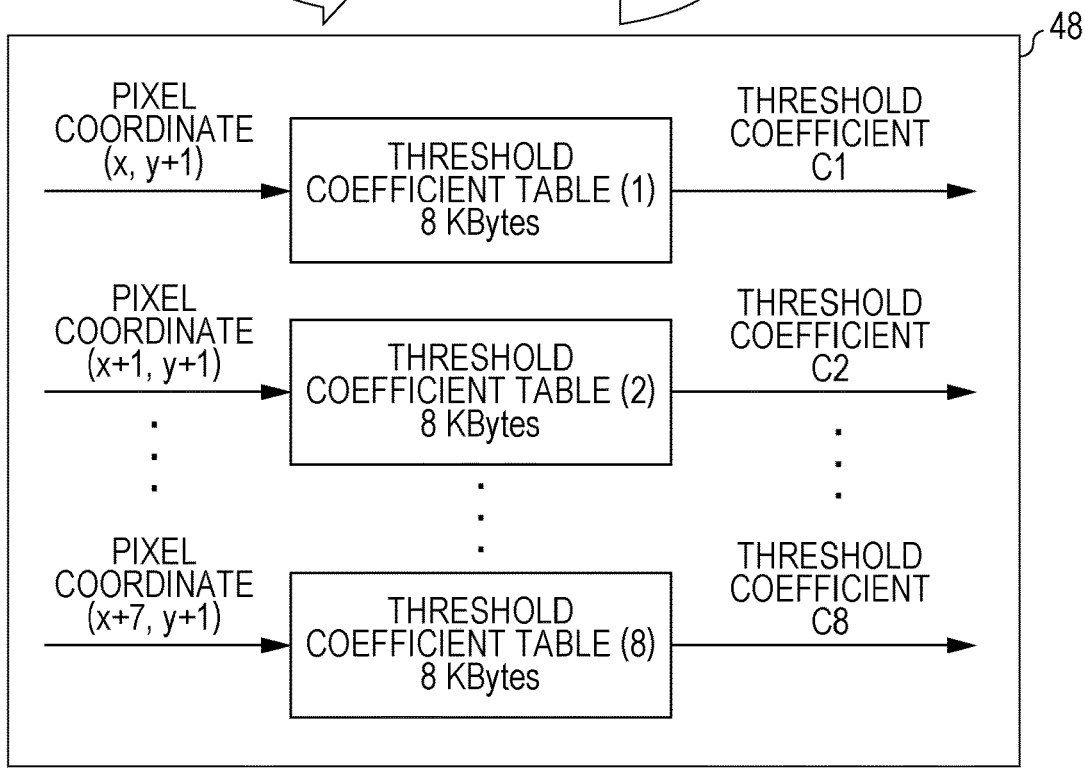

RECONFIGURABLE LOGICAL CIRCUIT

CROSS-REFERENCE TO RELATED APPLICATIONS

This application is based on and claims priority under 35 USC 119 from Japanese Patent Application No. 2016-164829 filed Aug. 25, 2016.

BACKGROUND

(i) Technical Field

The present invention relates to a reconfigurable logical circuit.

(ii) Related Art

Conventionally, reconfigurable (configurable) logical circuits are known.

SUMMARY

Conventionally, a logical circuit is reconfigured by writing data into a memory on the basis of a clock, a control signal, and a data bus that are externally supplied, and overall rewrite of the logical circuit requires a millisecond-order period.

In the case of operation that does not require rewrite of a logical circuit, it is only necessary to rewrite the logical circuit when a device including the logical circuit is powered on. Meanwhile, in the case of operation that requires real-time rewrite of processing contents, the percentage of a rewrite period in the whole processing is large if a processing period per processing unit is shorter than a millisecond-order. This makes it impossible to achieve desired performance.

FIGS. 14A and 14B schematically illustrate a relationship between a data processing period and a rewrite period for reconfiguration (configuration). FIG. 14A illustrates desired processing. In FIG. 14A, both processing A and processing B require 10 ms. A rewrite period for transition from the processing A to the processing B is sufficiently shorter than the processing periods of the processing A and the processing B. For example, the rewrite period is desirably 1 ms or shorter. Meanwhile, FIG. 14B illustrates a case where the rewrite period is, for example, 90 ms. In FIG. 14B, the rewrite period is longer than the periods for the processing A and the processing B, and the percentage of rewrite in the whole processing is markedly large.

Although it is also possible to partially rewrite a logical circuit instead of entirely rewriting the logical circuit, a rewrite period is proportional to a logic capacity, and therefore even partial rewrite takes a considerable period if a relatively large functional block is rewritten. This makes it difficult to achieve desired processing.

According to an aspect of the invention, there is provided a reconfigurable logical circuit including: a data processing unit; a memory in which plural combinations of configuration control bits are stored; and a selector unit that selectively switches the plural combinations of configuration control bits stored in the memory and supplies a selected one of the plural combinations of configuration control bits to the data processing unit to reconfigure processing contents of the data processing unit.

BRIEF DESCRIPTION OF THE DRAWINGS

Exemplary embodiments of the present invention will be described in detail based on the following figures, wherein:

FIG. 10 is an explanatory view for explaining reconfiguration according to Third Embodiment;

DETAILED DESCRIPTION

Embodiments of the present invention are described below with reference to the drawings.

First Embodiment

Figure 1:
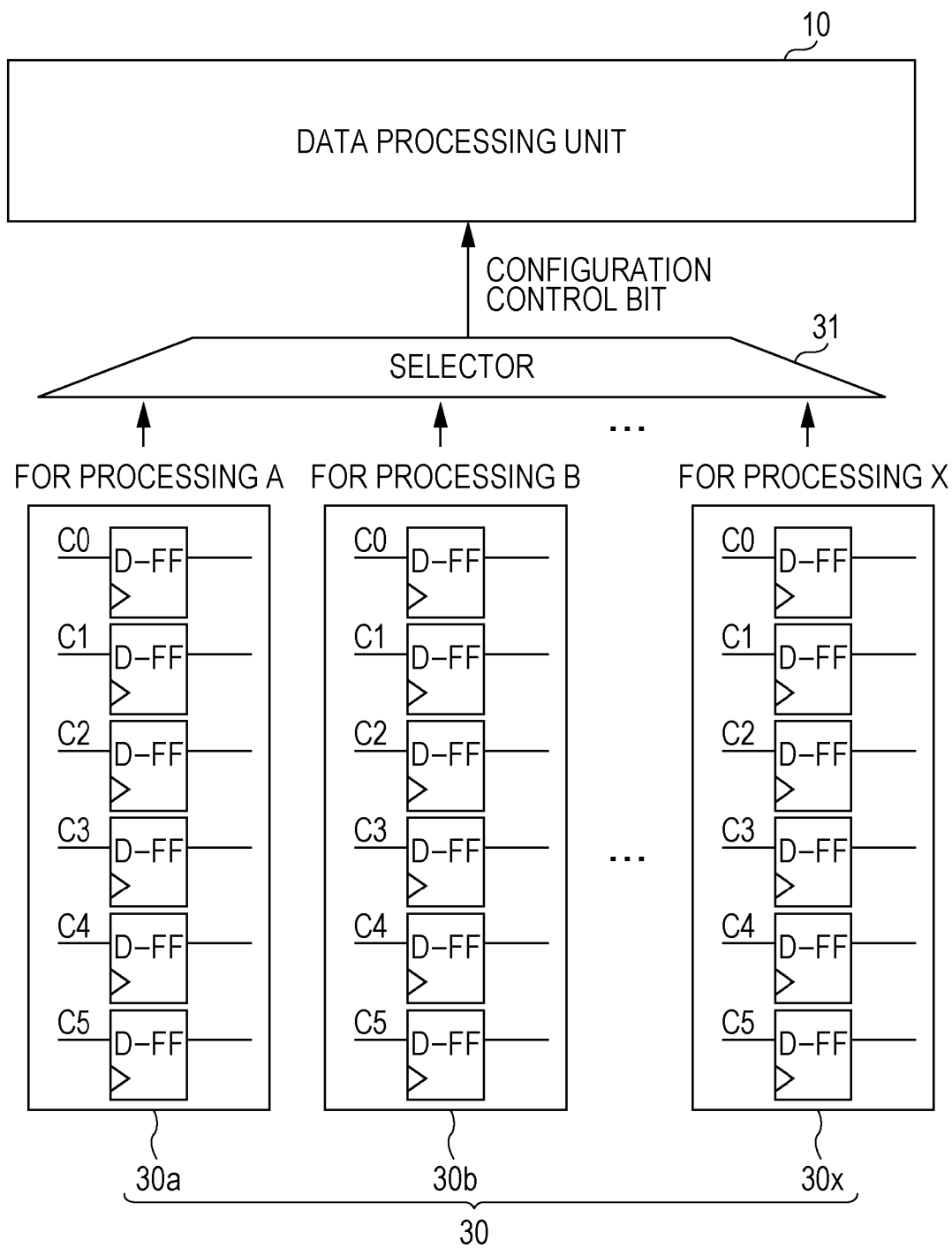
FIG. 1 is a configuration diagram according to First Embodiment.

FIG. 1 illustrates a configuration of a reconfigurable logical circuit according to the present exemplary embodiment. The reconfigurable logical circuit includes a data processing unit 10, a holding unit 30 that holds plural combinations of configuration control bits, and a selector unit 31.

Figure 13:
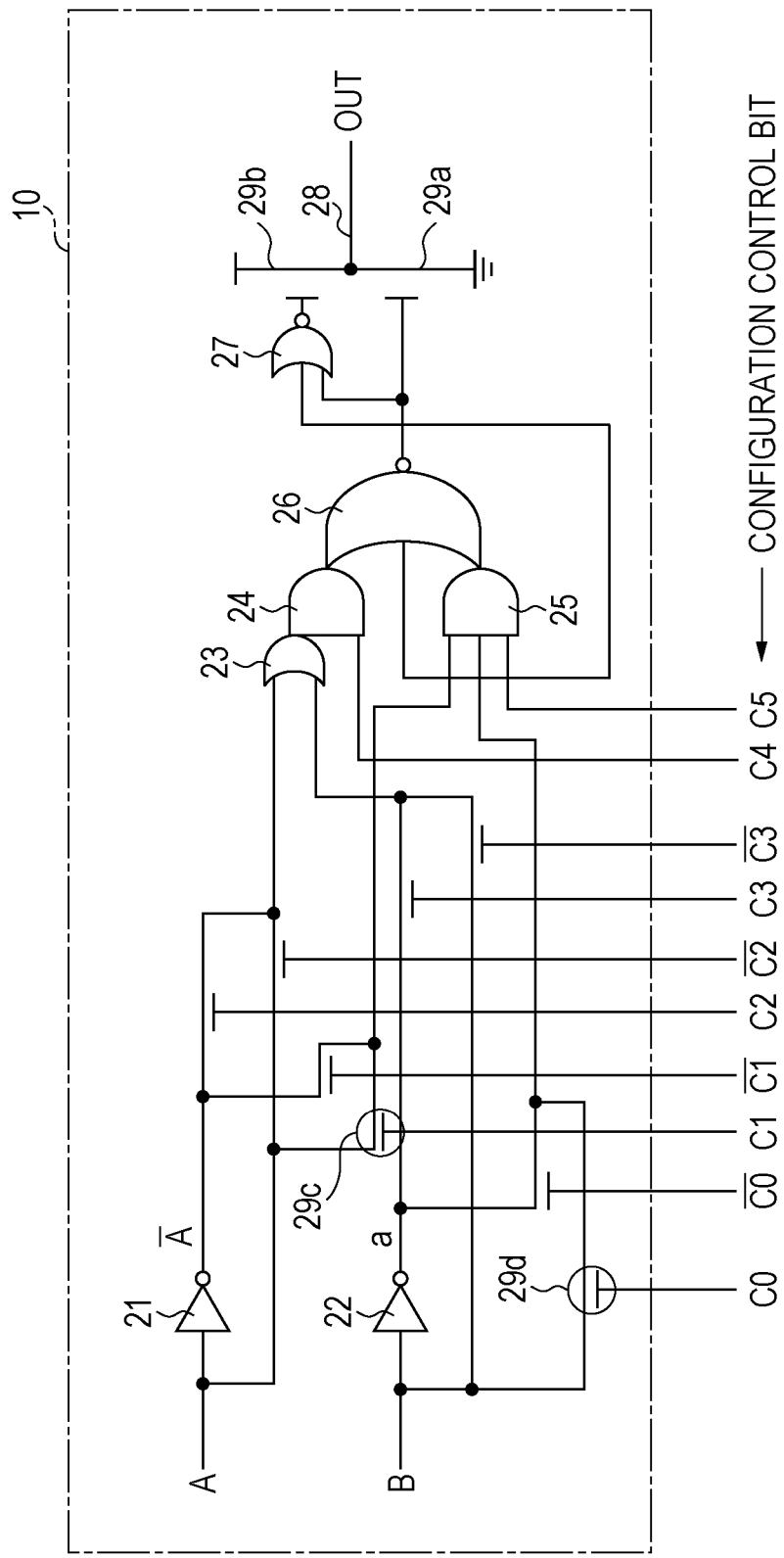
FIG. 13 is a configuration diagram of a conventional circuit.
Figure 14A:
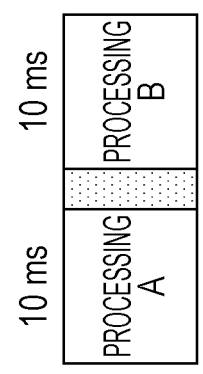
FIGS. 14A and 14B are schematic views illustrating a relationship between a processing period and a rewrite period in the conventional circuit.
Figure 14B:
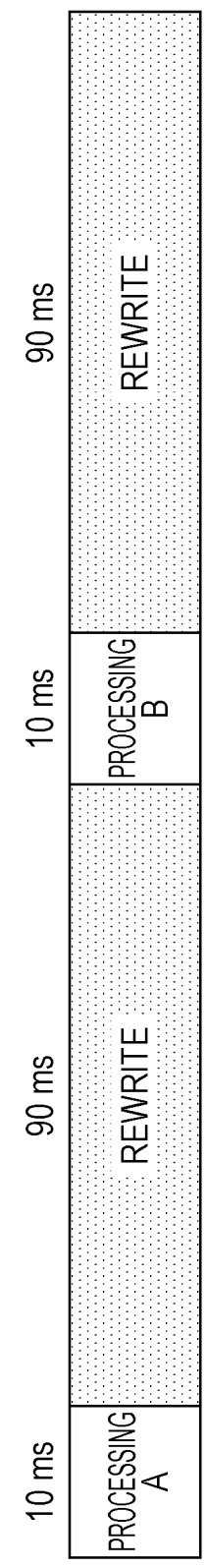

The data processing unit 10 is identical to the logical circuit illustrated in FIG. 13 and includes plural logical gates.

The configuration control bit holding unit 30 is, for example, a register that holds plural combinations of configuration control bits. In FIG. 1, the configuration control bit holding unit 30 includes a holding unit 30a for processing A, a holding unit 30b for processing B, . . . , and a holding unit 30x for processing X. Each of the holding units 30a, 30b, . . . , and 30x holds a combination of 6 bits in total (C0, C1, C2, C3, C4, and C5) in a D-FF (D-type flip-flop) and supplies the combination to the selector unit 31. Specifically, the configuration control bit holding unit 30 holds a combination of configuration control bits for the processing A, a combination of configuration control bits for the processing B, . . . , and a combination of configuration control bits for the processing X. The number of combinations of configuration control bits held in the configuration control bit holding unit 30 is two or more and is not limited in particular, and the number of configuration control bits in each combination is not limited to 6 bits.

The selector unit 31 receives the combination of configuration control bits for the processing A, the combination of configuration control bits for the processing B, . . . , and the combination of configuration control bits for the processing X from the configuration control bit holding unit 30, selects any of these combinations of configuration control bits in accordance with a selector control signal, and supplies the selected combination to the data processing unit 10 to reconfigure the data processing unit 10.

Specifically, in a case where the processing A is executed in the data processing unit 10, the selector unit 31 supplies the combination of configuration control bits C0 through C5 held in the configuration control bit holding unit 30a to the data processing unit 10. For example, the selector unit 31 supplies a combination (C0=1, C1=1, C2=0, C3=0, C4=0, and C5=1) to configure the data processing unit 10. Next, in a case where the data processing unit 10 is reconfigured from the processing A to the processing B, the selector unit 31 supplies the combination of configuration control bits C0 through C5 held in the configuration control bit holding unit 30b to the data processing unit 10. For example, the selector unit 31 supplies a combination (C0=0, C1=0, C2=1, C3=1, C4=1, and C5=0) to reconfigure the data processing unit 10.

As described above, the configuration control bit holding unit 30 includes, for respective types of processing, plural holding units 30 for holding configuration control bits, and when the need to switch processing occurs, the processing is switched to desired processing, for example, from the processing A to the processing B and then to the processing C in accordance with a selector control signal or a trigger signal. This makes it possible to shorten a rewrite period for reconfiguration. In the present exemplary embodiment, a period required for rewrite is equal to a period required for switching in the selector unit 31. Accordingly, rewrite may be achieved in 1 ms or shorter.

A processing switching timing need just be determined by software. For example, at a timing of execution of the processing A, a CPU (not illustrated) supplies a trigger signal for the processing A to the selector unit 31 in accordance with a processing program. This causes the selector unit 31 to select the combination of configuration control bits for the processing A to configure the data processing unit 10. Upon detection of completion of the processing A by software, the CPU supplies a trigger signal for the processing B to the selector unit 31 in accordance with the processing program. This causes the selector unit 31 to select the combination of configuration control bits for the processing B to reconfigure the data processing unit 10.

Second Embodiment

In First Embodiment, a rewrite period for reconfiguration may be shortened to 1 ms or shorter, for example, 90 µs. Meanwhile, in a case where a period required for data processing in the data processing unit 10 is further shortened, for example, to approximately 10 µs, the percentage of rewrite is relatively large.

Figure 2:
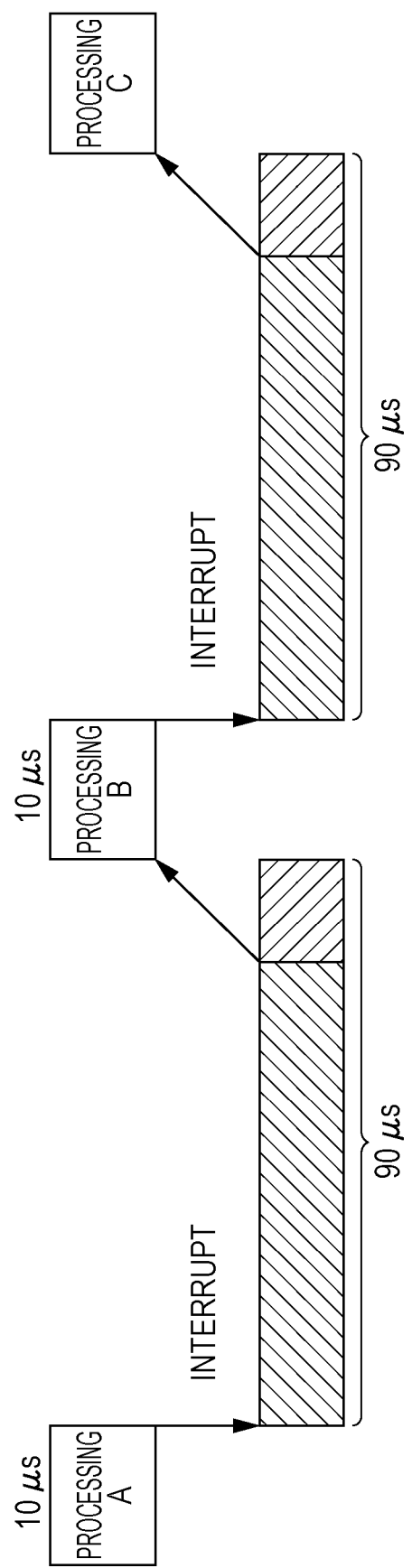
FIG. 2 is a schematic view illustrating a relationship between a processing period and a rewrite period according to First Embodiment.

FIG. 2 schematically illustrates a relationship between the processing period and the rewrite period in this case. Processing A and processing B are executed in 10 µs by hardware in a data processing unit 10, and switching and rewriting processing is executed in 90 µs by software in a selector unit 31. That is, for example, the processing A is executed in 10 µs, the data processing unit 10 is rewritten in 90 µs, the processing B is executed in 10 µs, the data processing unit 10 is rewritten in 90 µs, and then processing C is executed in 10 µs. In a case where a rewrite period is relatively long, the rewrite period for reconfiguration cannot be hidden in the whole processing. In this case, the rewrite period is overhead, and the system performance deteriorates.

In view of this, in the present exemplary embodiment, a configuration for making a rewrite period shorter than that in First Embodiment is described.

Figure 3:
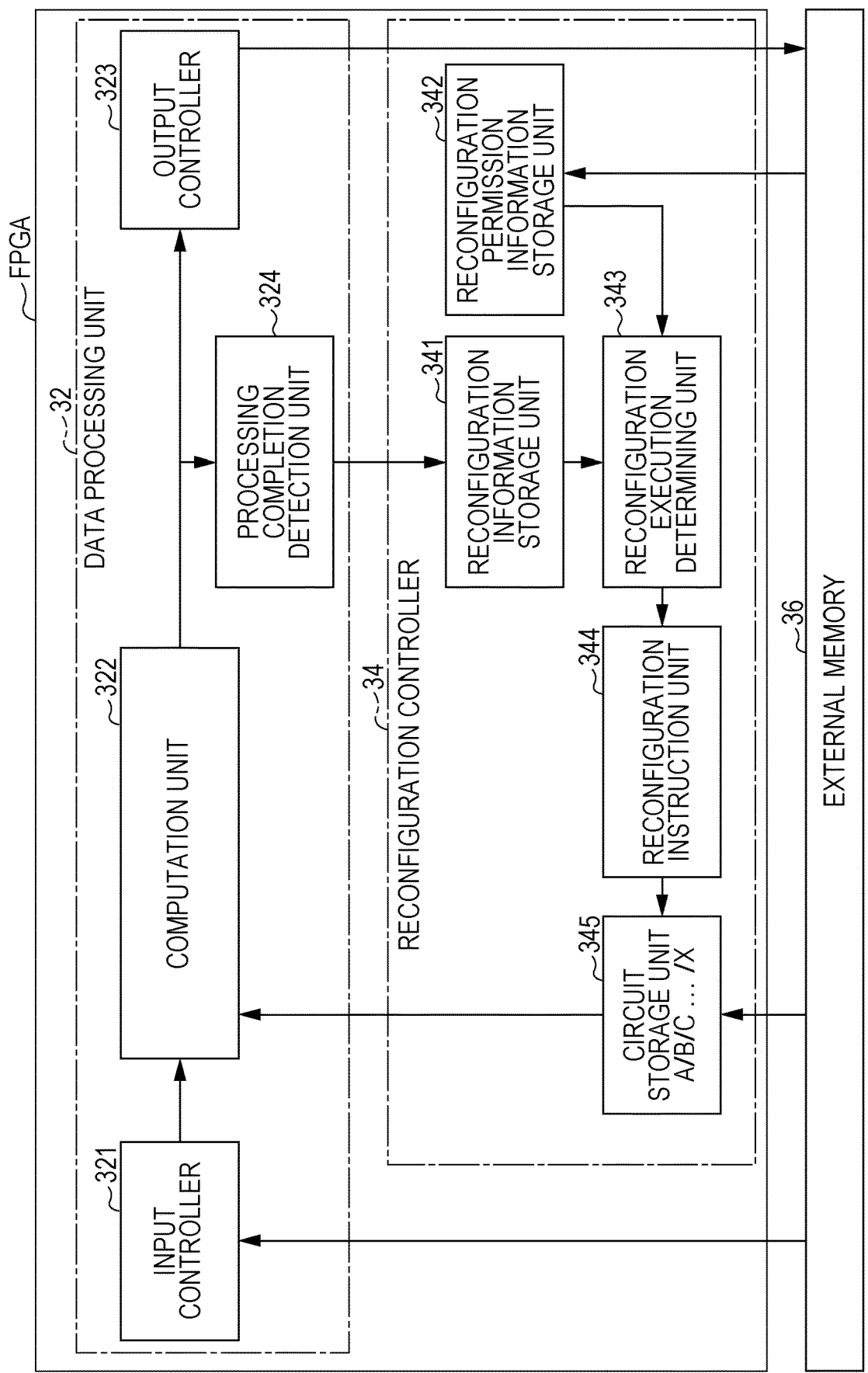
FIG. 3 is a configuration diagram according to Second Embodiment.

FIG. 3 illustrates a configuration of a reconfigurable logical circuit according to the present exemplary embodiment. A field-programmable gate array (FPGA) serving as the reconfigurable logical circuit includes a data processing unit 32 and a reconfiguration controller 34.

The data processing unit 32 includes an input controller 321, a computation unit 322, an output controller 323, and a processing termination detection unit 324.

The input controller 321 reads data stored in an external memory 36 and supplies the data to the computation unit 322.

The computation unit 322 processes the data on the basis of reconfigured contents and supplies the processed data to the output controller 323.

The output controller 323 writes a computation result into the external memory 36.

The processing termination detection unit 324 monitors the state of the computation unit 322 and the state of the output controller 323. Upon detection of termination of processing, the processing termination detection unit 324 supplies information indicative of termination of processing to the reconfiguration controller 34 side.

The reconfiguration controller 34 includes a reconfiguration information storage unit 341, a reconfiguration permission information storage unit 342, a reconfiguration execution determining unit 343, a reconfiguration instruction unit 344, and a circuit storage unit 345.

The reconfiguration information storage unit 341 receives processing termination detection information from the processing termination detection unit 324.

The reconfiguration permission information storage unit 342 holds a value for permission of reconfiguration of the data processing unit 32 in advance.

The reconfiguration execution determining unit 343 determines whether or not information stored in the reconfiguration information storage unit 341, i.e., information supplied from the processing termination detection unit 324 and the value stored in the reconfiguration permission information storage unit 342 match each other by comparing the information stored in the reconfiguration information storage unit 341 and the value stored in the reconfiguration permission information storage unit 342. In a case where the information stored in the reconfiguration information storage unit 341 and the value stored in the reconfiguration permission information storage unit 342 match each other, the reconfiguration execution determining unit 343 supplies a signal indicative of the matching to the reconfiguration instruction unit 344.

The reconfiguration instruction unit 344 supplies a selector signal to the circuit storage unit 345 in accordance with a signal supplied from the reconfiguration execution determining unit 343.

The circuit storage unit 345 includes configuration control bit holding units 30 for respective types of processing and a selector unit 31. The circuit storage unit 345 supplies a combination of configuration control bits to the computation unit 322 of the data processing unit 10 in accordance with the selector control signal supplied from the reconfiguration instruction unit 344 and thus switches processing contents of the computation unit 322 among processing A, processing B, . . . , and processing X.

Figure 4:
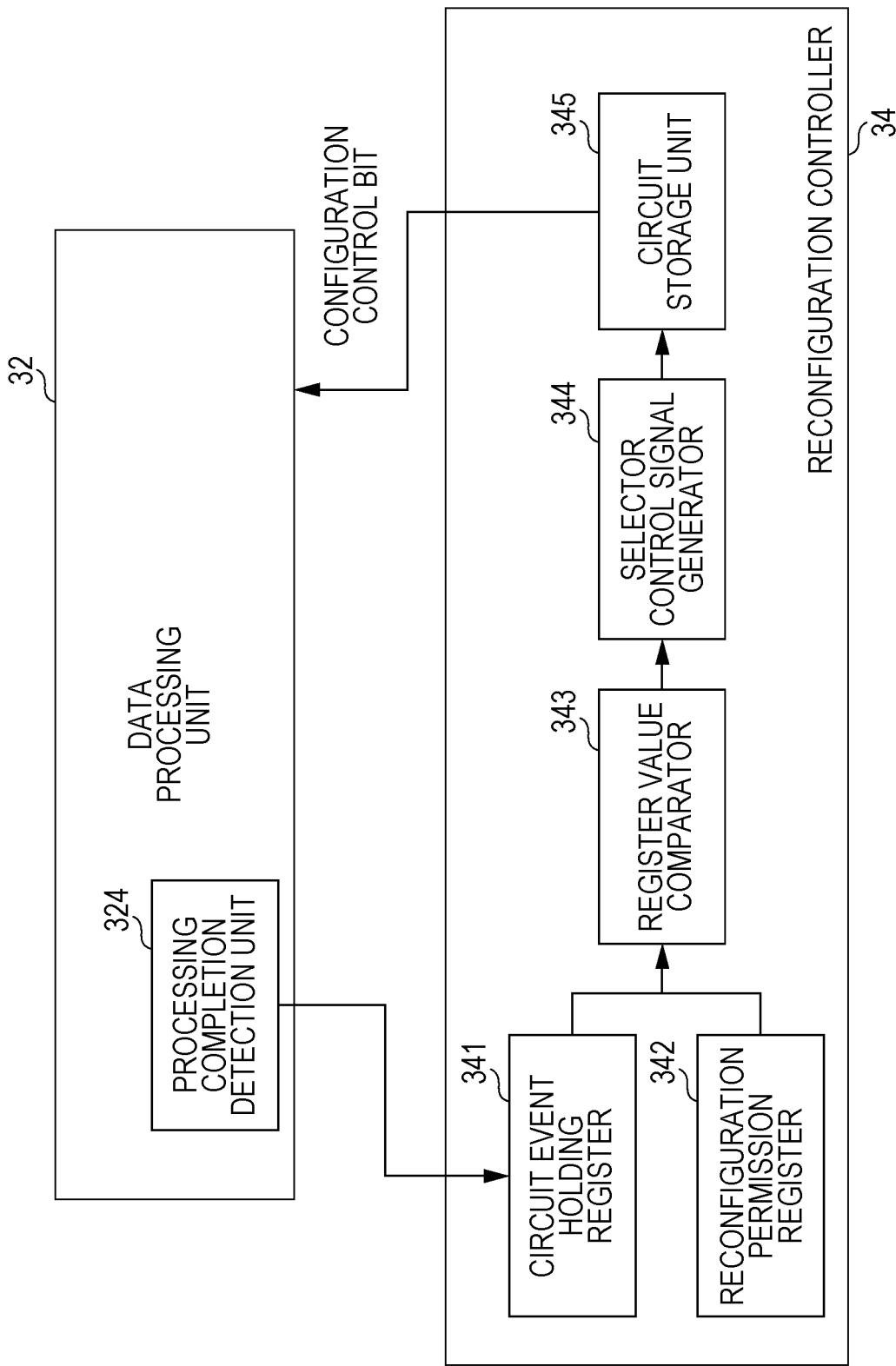
FIG. 4 is a functional block diagram according to Second Embodiment.
Figures 5, 6:
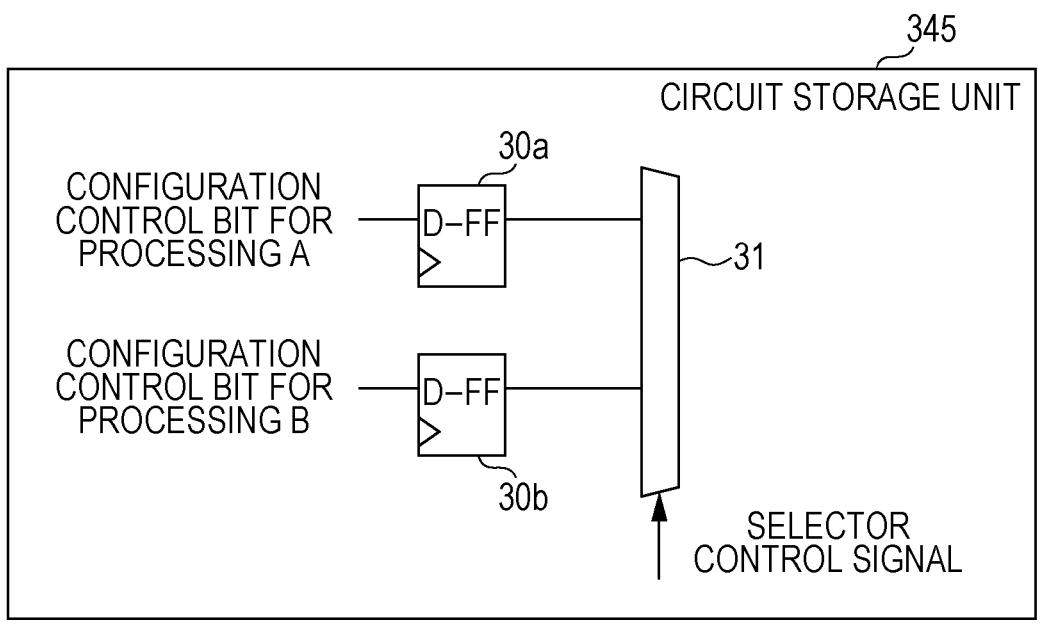
FIG. 5 is a configuration diagram of a circuit storage unit according to Second Embodiment.
FIG. 6 is an explanatory view illustrating setting values stored in a reconfiguration permission register according to Second Embodiment.

FIGS. 4 and 5 are functional block diagrams of the FPGA illustrated in FIG. 3, especially the reconfiguration controller 34. A case where the processing is switched between the processing A and the processing B is described below as an example.

The processing termination detection unit 324 of the data processing unit 32 monitors the state of the computation unit 322 and the state of the output controller 323. Upon detection of termination of processing, the processing termination detection unit 324 writes a circuit switching setting value into a circuit event holding register 341 serving as the reconfiguration information storage unit 341.

Meanwhile, a circuit switching setting value is stored in advance in the reconfiguration permission register 342 serving as the reconfiguration permission information storage unit 342. FIG. 6 illustrates an example of a setting value stored in the reconfiguration permission register 342. For example, any of three values "0X00", "0X01", and "0X02" which are hexadecimal vales is stored as the setting value. It is assumed that "0X00" means "not reconfigured", "0X01" means "reconfigured to processing A", and "0X02" means "reconfigured to processing B".

See FIGS. 3, 4, and 5 again. When a value is written from the processing termination detection unit 324 into the circuit event holding register 341, a register value comparator 343 serving as the reconfiguration execution determining unit 343 compares a value stored in the circuit event holding register 341 and a value stored in the reconfiguration permission register 342. In a case where these values match each other, the register value comparator 343 supplies a matching signal to a selector control signal generator 344 serving as the reconfiguration instruction unit 344. For example, in a case where "0X02" is stored in the reconfiguration permission register 342 and where "0X02" is also stored in the circuit event holding register 341 on the basis of completion of the processing A on an n-th line, these values match each other, and therefore the register value comparator 343 supplies a matching signal. In a case where the processing on the n-th line is not completed, "0X00" is stored in the circuit event holding register 341, and these values do not match, and therefore the register value comparator 343 does not supply a matching signal.

Upon receipt of the matching signal, the selector control signal generator 344 supplies a selector control signal to the selector unit 31 of the circuit storage unit 345. The selector unit 31 of the circuit storage unit 345 receives a combination of configuration control bits held in a holding unit 30a for the processing A and a combination of configuration control bits held in a holding unit 30b for the processing B, and the selector unit 31 supplies the combination of configuration control bits for the processing B to the computation unit 322 of the data processing unit 32 in accordance with the selector control signal.

Figure 7:
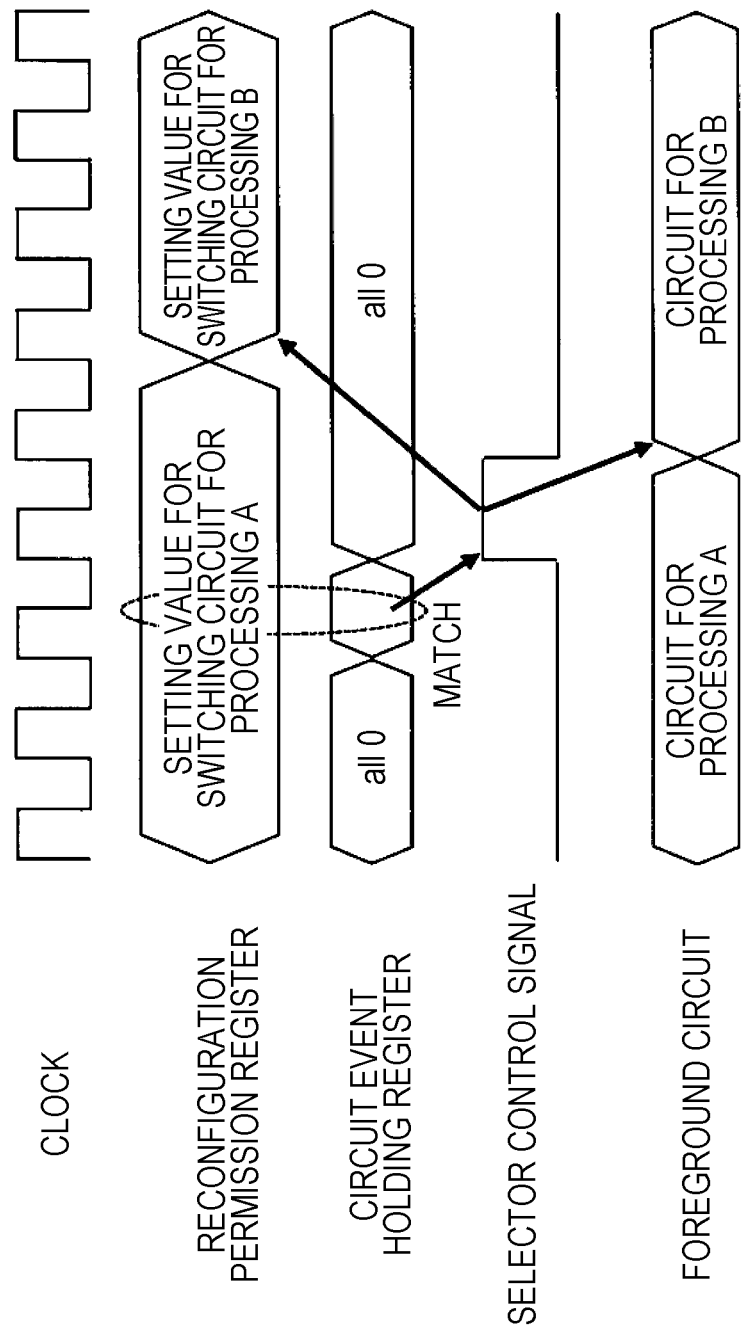
FIG. 7 is a timing diagram according to Second Embodiment.

FIG. 7 is a timing diagram at the time of switching. A switching setting value is stored in the reconfiguration permission register 342 in synchronization with a clock. For example, in a case where processing is switched in the data processing unit 32 in the order of processing A, processing B, processing A, processing B, . . . , a setting value for switching a circuit for the processing A is stored, and then a setting value for switching a circuit for the processing B is stored. The "setting value for setting a circuit for the processing A" refers to a setting value for switching from the circuit for the processing A and is specifically "0X02". The "setting value for switching a circuit for the processing B" refers to a setting value for switching from the circuit for the processing B and is specifically "0X01".

A value supplied from the processing termination detection unit 324 is stored in the circuit event holding register 341. The processing termination detection unit 324 outputs all "0" value (all0), i.e., "0X00" and stores this value in the circuit event holding register 341 while processing is being executed in the data processing unit 32. When the processing A is completed in the data processing unit 32, the processing termination detection unit 324 outputs "0X02" and stores this value in the circuit event holding register 341. When the processing B is completed in the data processing unit 32, the processing termination detection unit 324 outputs "0X01" and stores this value in the circuit event holding register 341.

Accordingly, when the processing A is completed in the data processing unit 32, "0X02" is stored in the circuit event holding register 341, and "0X02" is also stored in the reconfiguration permission register 342, and therefore the register value comparator 343 determines that the values match each other and outputs a selector control signal. On the basis of this selector control signal, the configuration control bits for the processing B are supplied from the circuit storage unit 345 to the data processing unit 32, and a circuit of the data processing unit 32 (expressed as a foreground circuit in FIG. 7) is switched from the circuit for the processing A to the circuit for the processing B. Accordingly, the setting value for switching the circuit for the processing B, i.e., "0X01" is stored in the reconfiguration permission register 342.

Figure 8:
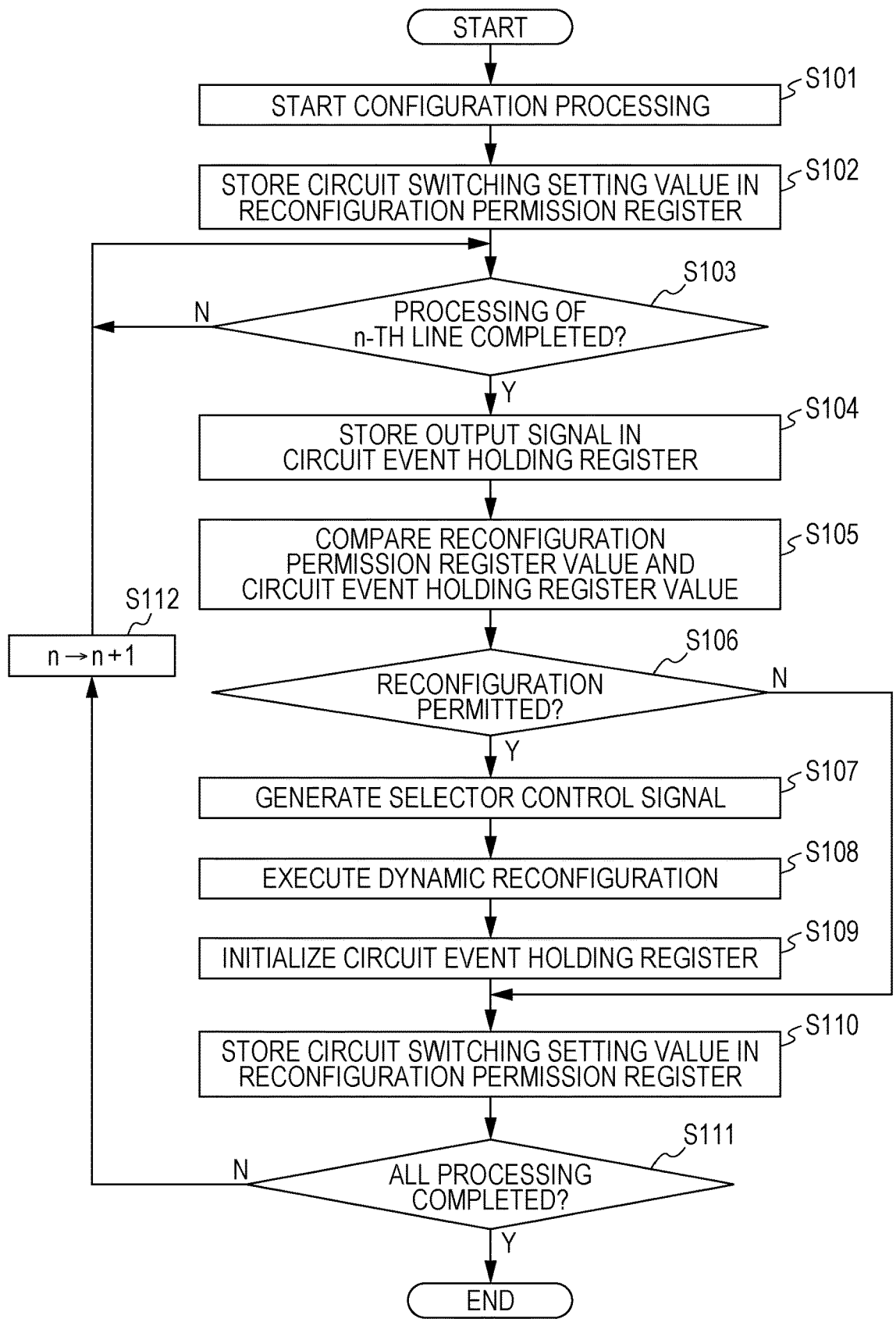
FIG. 8 is a processing flowchart according to Second Embodiment.

FIG. 8 is a processing flowchart according to the present exemplary embodiment. A case where processing is reconfigured for each line of an image is described below as an example.

When reconfiguration (configuration) processing starts (S101), a circuit switching setting value is stored in the reconfiguration permission register 342 in synchronization with a clock (S102). For example, "0X02" is stored as the setting value for switching the circuit for the processing A.

Next, the processing termination detection unit 324 determines whether or not processing on the n-th line of the image has been completed (S103). In a case where the processing on the n-th line has not been completed, current processing is continuously executed, and an initial value, i.e., "0X00" is continuously stored in the circuit event holding register 341. Meanwhile, in a case where the processing on the n-th line has been completed, the processing termination detection unit 324 stores an output signal in the circuit event holding register 341 (S104). In a case where the processing on the n-th line is the processing A, the processing termination detection unit 324 supplies the setting value for switching the circuit for the processing A, i.e., "0X02" to the circuit event holding register 341 upon completion of the processing on the n-th line.

The register value comparator 343 compares a value stored in the circuit event holding register 341 and a value stored in the reconfiguration permission register 342 (S105) and determines whether or not these values match each other, i.e., whether or not reconfiguration has been permitted (S106).

In a case where these values do not match each other (NO in S106), reconfiguration is not permitted and therefore is not executed, and the procedure proceeds to the processing in S110.

In a case where these values match each other (YES in S106), the selector control signal generator 344 outputs a selector control signal (S107), supplies a combination of configuration control bits for the processing B to the computation unit 322 to reconfigure the data processing unit 32, i.e., switch the circuit configuration of the data processing unit 32 from the circuit configuration for the processing A to the circuit configuration for the processing B (S108). Then, the circuit event holding register 341 is initialized, i.e., "0X00" is stored in the circuit event holding register 341 (S109), and the setting value for switching the circuit for the processing B, i.e., "0X01" is stored in the reconfiguration permission register 342 (S110).

In a case where processing on all lines has not been completed, similar processing is repeated for the next (n+1) th line (S111 and S112). In this way, the data processing unit 32 is reconfigured while alternately switching between the processing A and the processing B for each line.

Third Embodiment

The hardware reconfiguration in Second Embodiment may be applied, for example, to dithering of an image. In the present exemplary embodiment, this application example is described.

Figure 9:
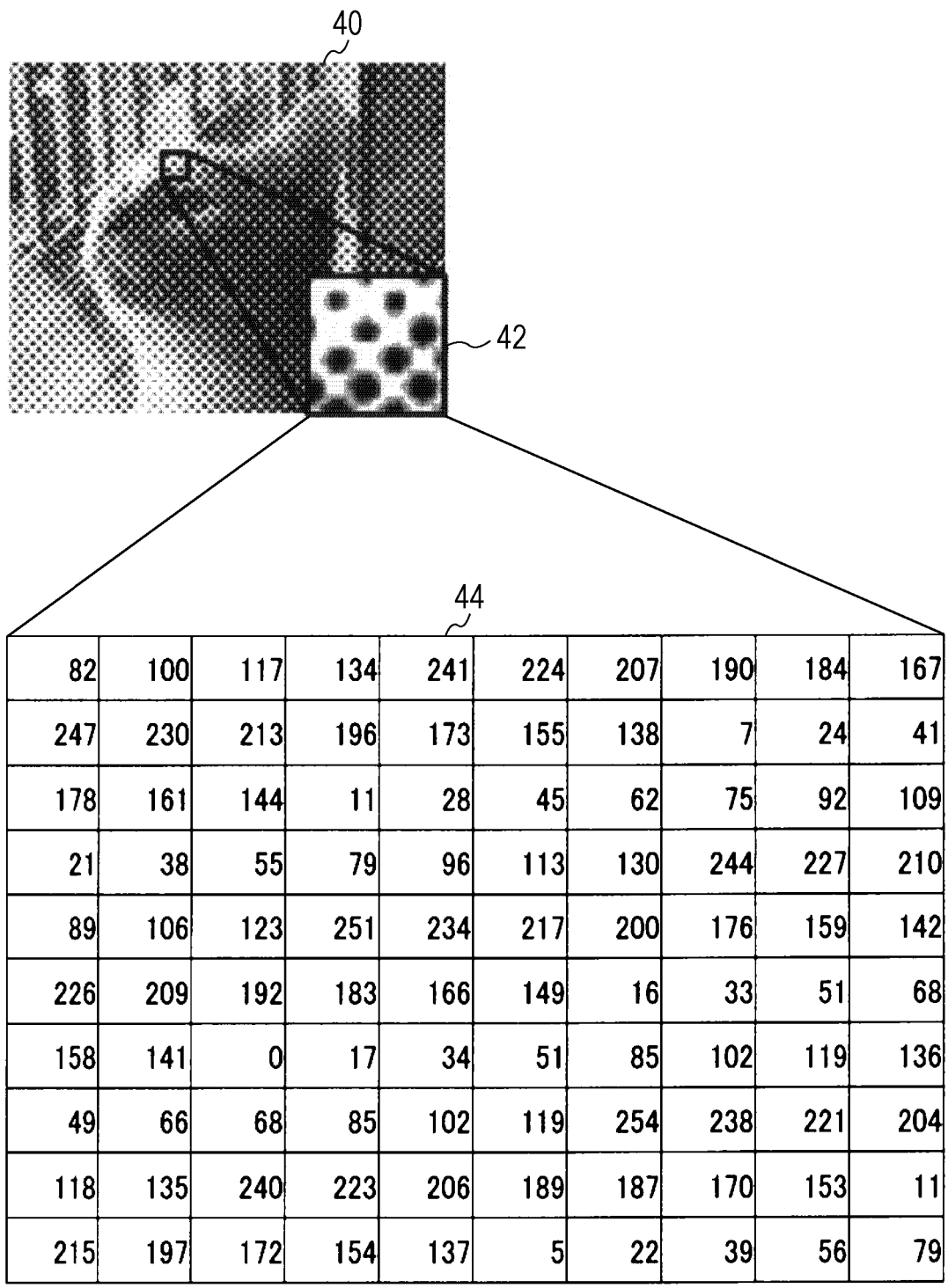
FIG. 9 is an explanatory view for explaining dithering according to Third Embodiment.

FIG. 9 illustrates an example of dithering of an image. FIG. 9 illustrates a dither matrix 44 of a partially enlarged view 42 of an image 40. In dithering, a multi-value gradation image is converted into an area coverage modulation image in order to achieve linear density when the image is printed. In dithering, a dither matrix (threshold value matrix) having M×N pixels is prepared, and whether or not a binary dot is formed is determined on the basis of whether or not a value of each pixel exceeds a threshold value.

In typical logical circuit processing, the dither matrix having M×N pixels is entirely stored in a memory, and input multi-value data and the threshold value of the matrix are compared for each pixel. However, the dither matrix other than target pixels is used only on lines including the target pixels. This wastes a memory capacity.

In view of this, processing is executed while rewriting dither matrix data per certain group of lines (e.g., N lines). This reduces a used memory capacity of a logical circuit. Furthermore, the speed of the processing may be increased by allocating a memory resource thus spared to parallelization.

Specifically, for example, in a case where the dither matrix 44 is made up of 256×256 blocks and has a size of 64 Kword, reconfiguration is executed by alternately switching between two logical circuits, i.e., a configuration #1 for odd-numbered lines and a configuration #2 for even-numbered lines although typically, a threshold value (threshold coefficient) C should be output for each pixel coordinate (x, y) by using a 64-Kbyte memory. Specifically, in the configuration #1, the threshold value (threshold coefficient) C is output for each pixel coordinate (x, y) in the odd-numbered lines by using a 8-Kbyte memory, and in the configuration #2, the threshold value (threshold coefficient) C is output for each pixel coordinate (x, y+1) in the even-numbered lines by using a 8-Kbyte memory, and each pixel value is compared with the threshold value (threshold coefficient). This makes it possible to reduce a memory capacity.

FIG. 10 schematically illustrates reconfiguration in this case. A threshold circuit 46 for odd-numbered lines and a threshold circuit 48 for even-numbered lines are dynamically reconfigured for each line. The threshold circuit 46 includes 8 threshold coefficient tables of 8 Kbytes in total as dither matrices, and these threshold coefficient tables output threshold coefficients C1, C2, . . . , and C8 corresponding to pixel coordinates (x, y), (x+1, y), . . . , and (x+7, y), respectively. The threshold circuit 48 includes 8 threshold coefficient tables of 8 Kbytes in total as dither matrices, and these threshold coefficient tables output threshold coefficients C1, C2, . . . , and C8 corresponding to pixel coordinates (x, y+1), (x+1, y+1), . . . , and (x+7, y+1), respectively.

In an odd-numbered line, the threshold circuit is switched to the threshold circuit 46, and the threshold coefficients C1, C2, . . . , and C8 are output corresponding to the pixel coordinates (x, y), (x+1, y), . . . , and (x+7, y) of the odd-numbered line. Next, in an even-numbered line, the threshold circuit is reconfigured to the threshold circuit 48, and the threshold coefficients C1, C2, . . . , and C8 are output corresponding to the pixel coordinates (x, y+1), (x+1, y+1), . . . and (x+7, y+1).

This makes it possible to execute reconfiguration while reducing a memory capacity to 8 Kbytes and thereby achieve both a reduction in circuit cost and an improvement in parallel processing performance. In a case where reconfiguration is executed for each line as described above, the number of times of reconfiguration is $10^3$ to $10^4$. However, by shortening a period per reconfiguration by applying the hardware reconfiguration in Second Embodiment, it is possible to prevent a deterioration in performance.

Fourth Embodiment

Figure 11:
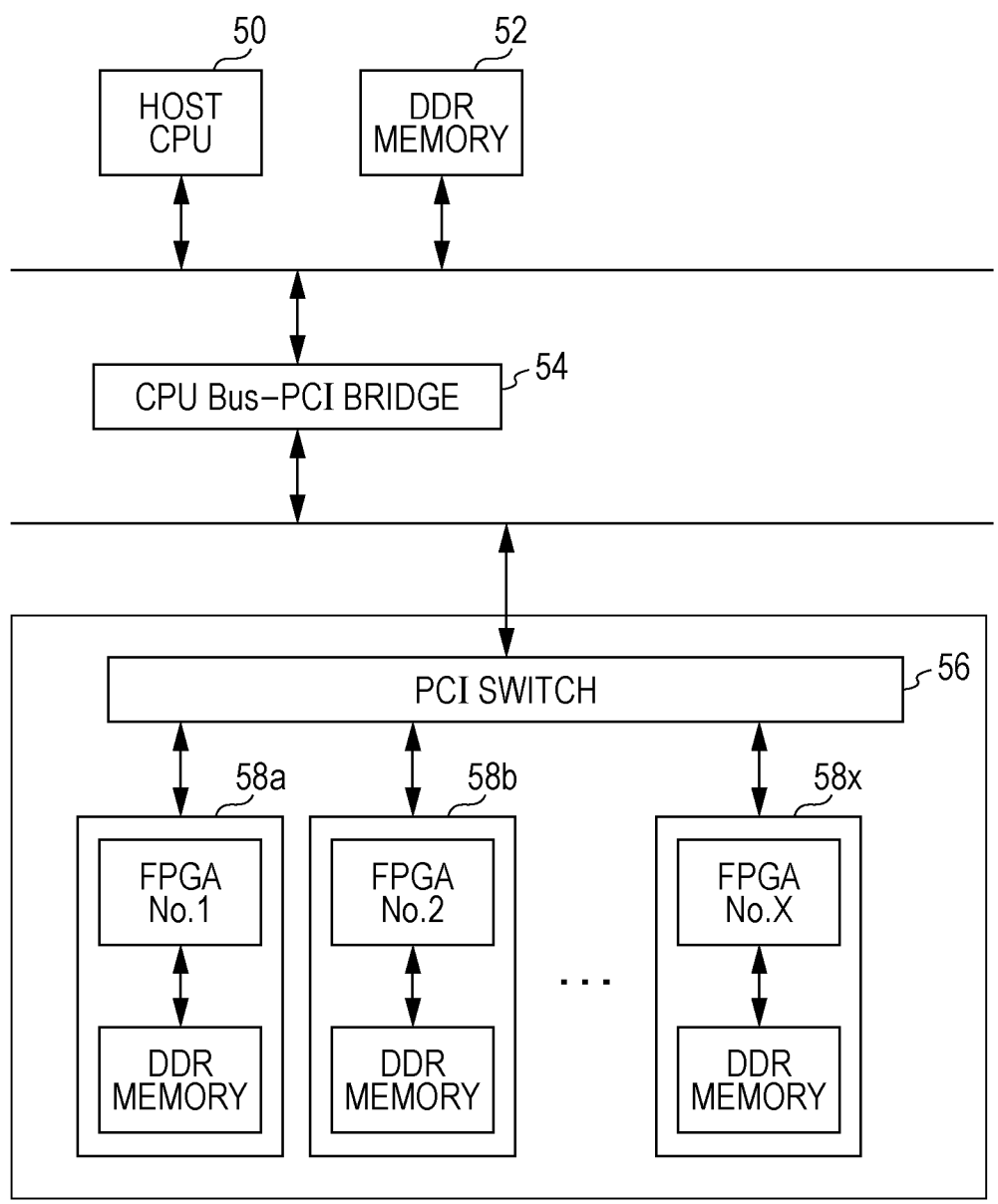
FIG. 11 is a system configuration diagram according to Fourth Embodiment.

FIG. 11 illustrates a system configuration according to the present exemplary embodiment. The system includes a host CPU 50, a double data rate (DDR) memory 52, a CPU Bus-PCI bridge 54, a PCI switch 56, and plural logical circuits 58a, 58b, . . . , and 58x each including an FPGA and a DDR memory. The logical circuit 58a is constituted by an FPGA No. 1 and a DDR memory, and plural combinations of configuration control bits for reconfiguring the FPGA No. 1 are stored in the DDR memory. One combination of configuration control bits is for configuring the FPGA No. 1 as a color conversion processing circuit, another combination of configuration control bits is for configuring the FPGA No. 1 as a calibration circuit, and still another combination of configuration control bits is for configuring the FPGA No. 1 as a filter processing circuit. Similarly, the logical circuit 58b is constituted by an FPGA No. 2 and a DDR memory, and plural combinations of configuration control bits for reconfiguring the FPGA No. 2 are stored in the DDR memory.

The host CPU 50 controls operation of the logical circuits 58a, 58b, . . . , and 58x and switches the circuit configurations of the FPGAs of the logical circuits 58a, 58b, . . . , and 58x. Furthermore, the host CPU 50 causes the logical circuits 58a, 58b, . . . , and 58x to operate in parallel.

Figure 12A:
FIGS. 12A through 12C are explanatory views for explaining processing according to Fourth Embodiment.
Figure 12B:
Figure 12C:
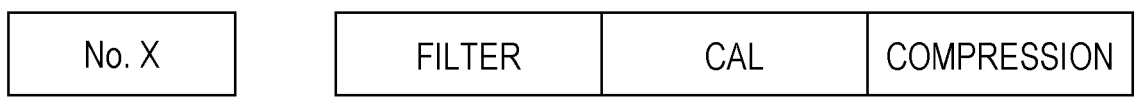

FIGS. 12A through 12C illustrate an example of a case where the logical circuits 58a, 58b, . . . , and 58x are operated in parallel. In FIGS. 12A through 12C, for example, processing of the logical circuit 58a is indicated by NO. 1, and processing of the logical circuit 58b is indicated by NO. 2.

The logical circuit 58a (NO. 1) is sequentially reconfigured in the order of color conversion processing, calibration (CAL) processing, and halftone dot processing, and the processing is executed in a time-division manner. In synchronization with this, the logical circuit 58b (NO. 2) is sequentially reconfigured in the order of color conversion processing, calibration (CAL) processing, and halftone dot processing, and the processing is executed in a time-division manner. Furthermore, the logical circuit 58x (No. X) is sequentially reconfigured in the order of filter processing, calibration (CAL) processing, and compression processing, and the processing is executed in a time-division manner. Accordingly, at a certain timing, the color conversion processing and the filter processing are executed in parallel. At another timing, the calibration processing and the calibration processing are executed in parallel. At still another timing, the halftone dot processing and the compression processing are executed in parallel. Printed image processing includes, for example, color conversion processing, filter processing, calibration processing, halftone dot screen processing, and compression processing. However, the reconfigured processing is not limited to these.

As described above, plural reconfigurable logical circuits are provided. Each of the reconfigurable logical circuits is reconfigured by switching a combination of configuration control bits and thus executes processing in a time-division manner. Furthermore, these plural reconfigurable logical circuits execute processing in parallel. This makes it possible to process data at high speed. In printed image processing, image processing may be executed without delay by increasing the number of circuits in accordance with the speed of a printer.

Embodiments of the present invention have been described above, but the present invention is not limited to these exemplary embodiments, and the exemplary embodiments may be modified in various ways.

For example, in each of the exemplary embodiments, basically, a case where an FPGA is used as a reconfigurable logical circuit has been described. Alternatively, a dynamically reconfigurable processor (DRP) may be used as a reconfigurable logical circuit. The DRP is a processor that may be rewritten at ultra-high speed (ns order) during operation of the circuit. Note, however, that in the case of the DRP, only a logical block may be rewritten and configured, and a CPU, a PCI-express IF, a DDR memory IF, and a direct memory access (DMA) controller cannot be changed. Therefore, there is no flexibility in positioning of an input/output (IO) pin. Meanwhile, an FPGA is constituted by a logical block and various input/output (IO) ports and may be used while connecting a DDR to a PCI as IO or connecting an optical device to an outside, and there is flexibility in positioning of an input/output pin. For example, an FPGA may include plural PCIIFs and be used as a PCI switch device, and whether or not to configure a CPU therein may also be selected.

Specifically, for example, in certain processing, an FPGA is configured as a CPU, a computation unit that executes processing A, a DDRIF, a PCIIF, and an optical IF, and in next processing, the FPGA is reconfigured as a CPU, a computation unit that executes processing B, a PCIIF, a PCIIF, and a PCIIF by reconfiguring the computation unit, the DDRIF, and the optical IF. Therefore, use of an FPGA as a reconfigurable logical circuit allows reconfiguration including change of the position of an input/output pin.

Alternatively, it is also possible to employ an arrangement in which a DRP is used in reconfiguration that does not require change of the position of an input/output pin and an FPGA is used in reconfiguration involving change of the position of the input/output pin, considering that the position of the input/output pin is fixed in the DRP and that there is flexibility in positioning of the input/output pin in the FPGA. In a case where plural reconfigurable logical circuits are provided, DRPs and FPGAs may be mixed.

In recent years, an FPGA called SoC in which a CPU and a peripheral device IF are provided in a fixed area as in a DRP has been proposed. Such a SoC may also be used in the present invention.

In First Embodiment, reconfiguration is executed by software. In Second and Third Embodiments, reconfiguration is executed by hardware. These may be combined. Specifically, reconfiguration may be executed by cooperation of software and hardware. The expression "switching by software" encompasses not only an aspect in which the switching is entirely executed by software, but also an aspect in which the switching is mainly executed by software. The expression "switching by hardware" encompasses not only an aspect in which the switching is entirely executed by hardware, but also an aspect in which the switching is mainly executed by hardware. A rewrite period may be adjusted by optimizing a ratio of hardware or software relative to a data processing period in accordance with the data processing period. In a case where plural reconfigurable logical circuits are provided, reconfiguration by software or reconfiguration by hardware may be selected for each reconfigurable logical circuit. For example, it is possible to employ an arrangement in which a certain group of reconfigurable logical circuits is reconfigured by hardware and another group of reconfigurable logical circuits is reconfigured by software.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A reconfigurable logical circuit comprising:
   a data processor configured to perform data processing, the data processor comprising a processing termination detector that determines a status corresponding to termination of the data processing and generate status information based on the determination of the status;
   a memory storing a plurality of combinations of configuration control bits;
   a reconfiguration controller configured to generate a selector control signal based on a comparison between the status information and a predetermined reconfiguration permission information; and
   a selector configured to select one of the plurality of combinations of configuration control bits to the data processor to reconfigure the data processor based on the selector control signal,
   wherein the processing termination detector detects termination of a first processing in the data processor and transmits, in response to detecting the termination of the first processing in the data processor, a first setting value to update and store the first setting value in an event holding storage, the first setting value configured for switching to a second processing to the reconfiguration controller, and
   wherein the reconfiguration controller compares the first setting value with a second setting value corresponding to the second processing stored in a reconfiguration permission information storage, and generates the selector control signal for the second processing when the reconfiguration controller determines that the first setting value and the second value are same.

2. The reconfigurable logical circuit according to claim 1, wherein
   the data processor includes a plurality of data processors;
   the memory includes a plurality of memories; and
   the selector includes a plurality of selectors.

3. The reconfigurable logical circuit according to claim 2, wherein
the switching is executed by software.

4. The reconfigurable logical circuit according to claim 2, wherein
the switching is executed by hardware.

5. The reconfigurable logical circuit according to claim 2, wherein
the data processor, the memory, and the selector are in an FPGA.

6. The reconfigurable logical circuit according to claim 3, wherein
the data processor, the memory, and the selector are in an FPGA.

7. The reconfigurable logical circuit according to claim 4, wherein
the data processor, the memory, and the selector are in an FPGA.

8. The reconfigurable logical circuit according to claim 1, wherein
the switching is executed by software.

9. The reconfigurable logical circuit according to claim 8, wherein
the data processor, the memory, and the selector are in an FPGA.

10. The reconfigurable logical circuit according to claim 1, wherein
the switching is executed by hardware.

11. The reconfigurable logical circuit according to claim 10, wherein
the switching is executed in accordance with detection information from the processing termination detector.

12. The reconfigurable logical circuit according to claim 10, wherein
the data processor, the memory, and the selector are in an FPGA.

13. The reconfigurable logical circuit according to claim 11, further comprising:
a reconfiguration information storage in which the status information from the processing termination detector is held as reconfiguration information; and
the reconfiguration permission information storage in which the reconfiguration permission information is held,
wherein the reconfiguration controller generates the selector control signal and supplies the selector control signal to the selector based on the information held in the reconfiguration information storage and the information held in the reconfiguration permission information storage.

14. The reconfigurable logical circuit according to claim 11, wherein
the data processor, the memory, and the selector are in an FPGA.

15. The reconfigurable logical circuit according to claim 13, wherein
the memory stores therein at least a combination of configuration control bits for the first processing in the data processor and a combination of configuration control bits for the second processing in the data processor;
the processing termination detector detects termination of the first processing in the data processor and causes a setting value for switching to the second processing to be stored in the reconfiguration information storage;
the reconfiguration permission information storage holds a setting value for switching from the first processing to the second processing;
the reconfiguration controller supplies the selector control signal to the selector in a case where the setting value stored in the reconfiguration information storage and the setting value held in the reconfiguration permission information storage match each other; and
the selector supplies the combination of configuration control bits for the second processing to the data processor in accordance with the selector control signal.

16. The reconfigurable logical circuit according to claim 13, wherein
the data processor, the memory, and the selector are in an FPGA.

17. The reconfigurable logical circuit according to claim 15, wherein
the data processor, the memory, and the selector are in an FPGA.

18. The reconfigurable logical circuit according to claim 1, wherein
the data processor, the memory, and the selector are in an FPGA.

19. A method for configuring a reconfigurable logical circuit comprising a data processor and a memory storing a plurality of combinations of configuration control bits, the method comprising:
determining a status corresponding to termination of data processing in the data processor and generating status information based on the determination of the status;
generating, by a reconfiguration controller, a selector control signal based on a comparison between the status information and a predetermined reconfiguration permission information;
selecting one of the plurality of combinations of configuration control bits to the data processor to reconfigure the data processor based on the selector control signal;
detecting termination of a first processing in the data processor and transmitting, in response to detecting the termination of the first processing in the data processor, a first setting value to update and store the first setting value in an event holding storage, the first setting value configured for switching to a second processing to the reconfiguration controller;
comparing, by the reconfiguration controller, the first setting value with a second setting value corresponding to the second processing stored in a reconfiguration permission information storage, and
generating the selector control signal for the second processing when the reconfiguration controller determines that the first setting value and the second value are same.

* * * * *